United States Patent [19]
Gallina

[11] 3,719,129
[45] March 6, 1973

[54] DRIVE MECHANISM

[76] Inventor: Harold Gallina, 40 Parkview Avenue, Belleville, N.J. 07109

[22] Filed: June 10, 1971

[21] Appl. No.: 151,849

[52] U.S. Cl..................95/53 R, 95/59, 352/121, 352/137, 352/169, 352/176, 352/178
[51] Int. Cl..................................G03d 13/04
[58] Field of Search.........95/53 R, 59; 352/121, 137, 352/169, 180, 190, 174, 175, 176, 177, 178

[56] References Cited

UNITED STATES PATENTS 3,397,937  8/1968  Schrader...........................352/169
2,606,476  8/1952  Waller..............................352/17

Primary Examiner—Samuel S. Matthews
Assistant Examiner—Monroe H. Hayes
Attorney—Sang Ki Lee

[57] ABSTRACT

A drive mechanism which includes a drive gear continuously driven by a drive motor, a spur gear having a plurality of teeth removed from a portion of the periphery thereof, and novel controls for engaging and disengaging the driven gear from the drive gear. The controls include a spring biased element positively locking the spur gear as the spur gear is disengaged from the drive gear, a trigger releasing the spur gear from the locked position, and an actuating element moving the spur gear into engagement with the driving gear as the trigger releases the spur gear from the locked position. The controls are adapted to permit the drive gear to rotate the spur gear through a predetermined angle and then apply a positive brake to the spur gear each time the trigger is actuated regardless of the length of time during which the trigger is actuated and at a wide range of repetition rates of trigger actuation. The mechanism may further include a photographic shutter coupled to the controls for actuating the shutter in synchronism with the operation of said controls.

13 Claims, 9 Drawing Figures

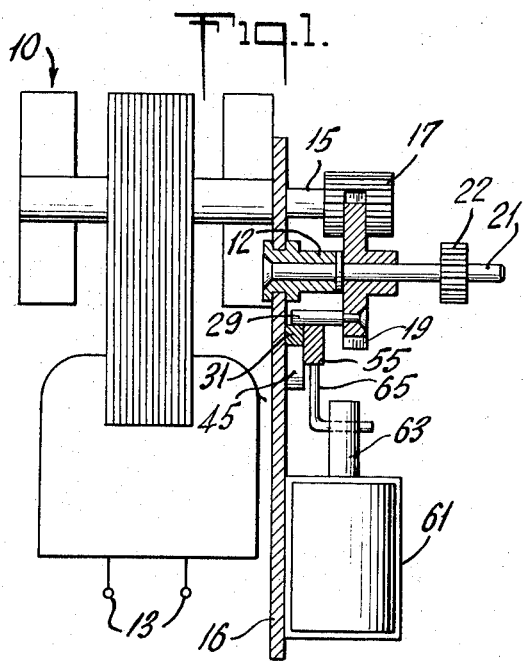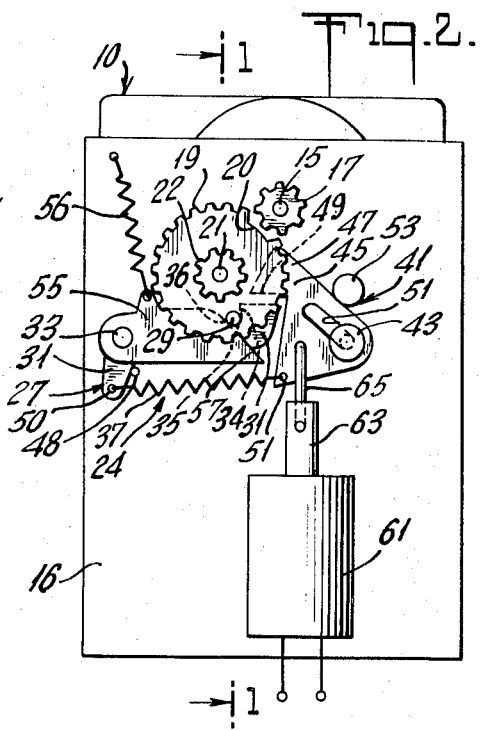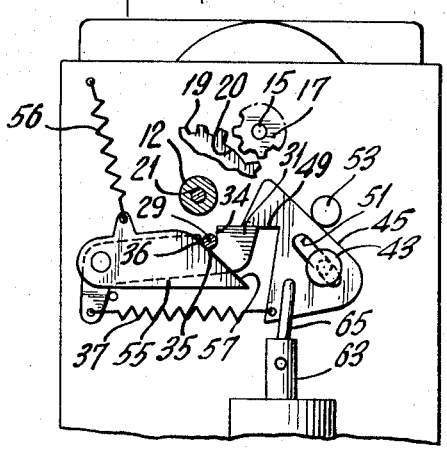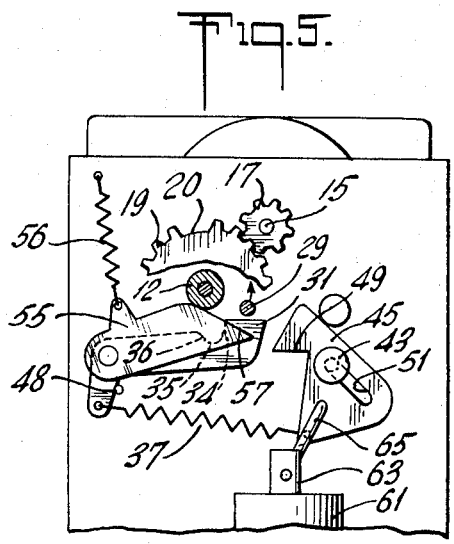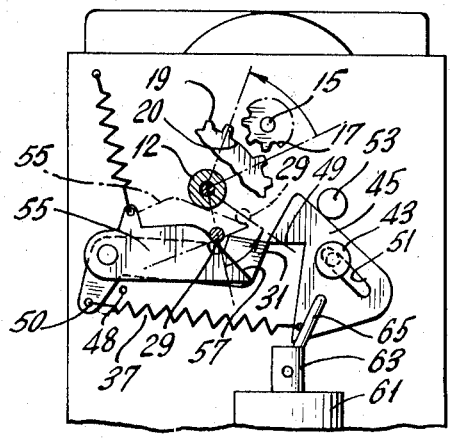
INVENTOR
HAROLD GALLINA
BY
ATTORNEY

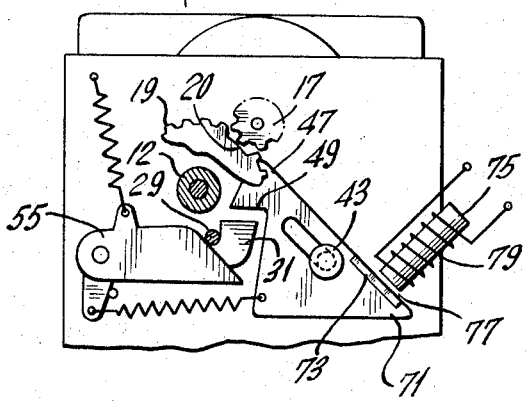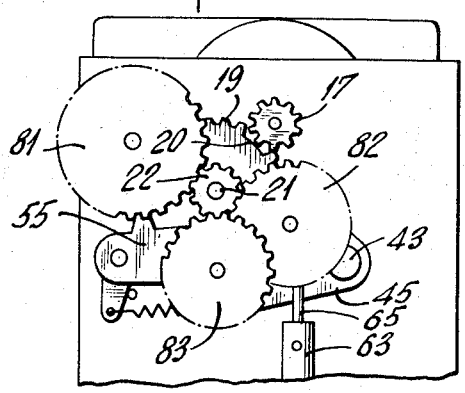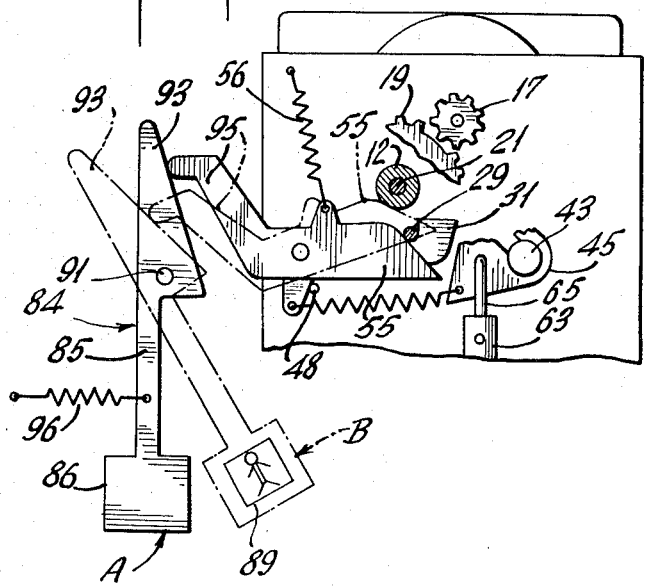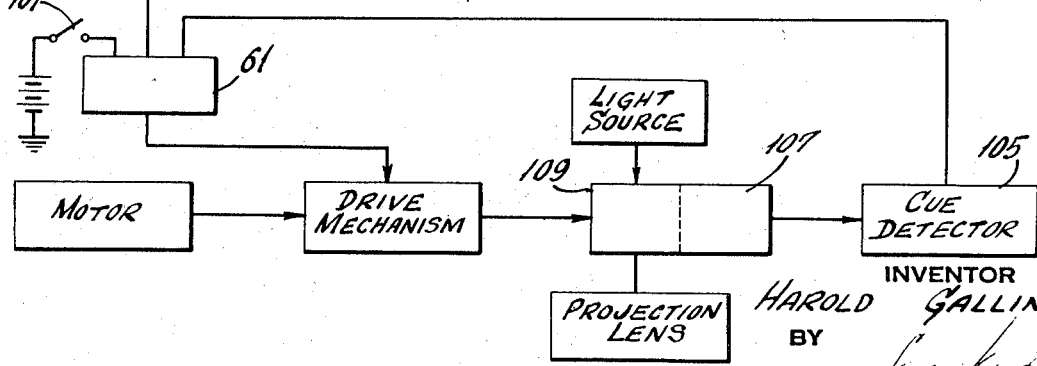

DRIVE MECHANISM

BACKGROUND OF THE INVENTION

1. Field of the Invention

This invention relates to a drive mechanism for converting a continuous rotational input drive into an intermittent output drive in a controlled manner and, more particularly, to a novel and simple control means in the mechanism for providing a precise and positive stop between each successive rotational movement of the output drive at a wide range of repetition rates.

2. Description of the Prior Art

The drive mechanism of the type described herein is suitable for index advancing mechanisms of various types, such as a sprocket wheel of a film strip projector or a conveyor belt feeding metered amounts of material. In drive mechanisms of these types, it is essential to provide a reliable and accurate indexing or feeding mechanism which is able to engage and disengage the output drive to rotate the latter through a predetermined angle and bring it to a complete stop in synchronization with the advancing mechanisms.

Various drive mechanisms have been utilized to control the output drive. For example, a Geneva drive mechanism has been utilized in the drive mechanism to maintain framing of each successive frame of a film strip so that the frames are driven through precisely the same displacement in sequence.

In these systems, it is also essential to advance the strip or the belt as quickly and as rapidly as possible between the successive stops. And, to these ends, various approaches have been used. One approach has been to employ a high-speed electric motor and use the shaft as the input drive to drive an output drive. And, a rather complex control mechanism, such as a combination of a pawl arrangement and a geneva gear, has been used to couple and decouple the input drive gear and the output drive. It has also been found that these known drive mechanisms generally require a considerable amount of maintenance to keep it functioning properly. Certain of these mechanisms also tend to jam or fail during the operation and thus damage the film strips and adversely affect film panning and sequencing. While these mechanisms have been satisfactory in certain applications, nevertheless, they fail to operate accurately and precisely at a high or varying speed of operation. Thus, for example, a typical drive mechanism used for advancing film strips of still pictures presently available on the market can operate at a preselected speed up to about 12 frames per second with a reasonable degree of reliability, but it is not capable of driving the film strips at widely variable speeds as high as 24 to 30 frames per second or at a higher speed without losing its reliability.

SUMMARY OF THE INVENTION

It is therefore an object of the present invention to provide a simplified and reliable drive mechanism.

It is another object of the present invention to provide an improved control means in the drive mechanism which can rotate the output drive reliably and accurately by a predetermined angle and stop it positively in response to an actuating signal irrespective of its time duration.

It is still another object of the present invention to provide simplified and reliable control means in the drive mechanism which provides reliable control at a high speed in indexing the stopping and starting movement of the output drive.

It is still further object of the present invention to provide a novel and improved means in the drive mechanism which provides more reliable and accurate control of the indexing movement of the output drive and which also provides shutter movement in synchronism with the indexing movement.

It is yet another object of the present invention to provide a reliable, versatile and fast-acting control means in the drive mechanism for moving and stopping the output drive.

These and other objects of the present invention are achieved in accordance with a preferred embodiment of the present invention by providing control means in a drive mechanism having a spring biased element for positively stopping and locking a driven member as it is disengaged from a driving member, a trigger for releasing the spring biased element from the locked position, and an actuating element for moving the driven member into engagement with the driving member, whereby the driven member undergoes a predetermined angular displacement whenever the trigger is actuated irrespective of the time duration of its actuation.

It is a feature of the present invention that the stopping and locking means includes a pin member attached to the driven member, and an elongated element with one end thereof being pivotally connected to the frame of the mechanism, the element having a notch at an intermediate position for receiving and retaining the pin member and a spring element urging the elongated element against the pin so that the pin is received in the notch and locked therein as the driven member disengages from the driving member which thereby positively stops rotation of the driven member.

Is is another feature of the present invention that the control means includes a trigger means having a pawl normally disposed at a released position and movable to an actuated position, the pawl being provided with a finger for tripping the locking means and releasing the pin from its notch.

It is yet another feature of the present invention that the control means includes an actuating means having an elongated element, one end thereof being pivotally connected to the frame and the other end being disposed to move against the pin, and a spring for urging the elongated element to rotate about the pivot thereof and push the pin member forward as it is released by the locking means so that the driven member is brought into engagement with the driving member for rotation.

It is still a further feature of the present invention that the drive mechanism includes a shutter mechanism connected to operate synchronously with the indexing movement of the output drive.

It is yet another feature of the present invention that the trigger means includes a magnetically permeable element enabling it to operate at an extremely high speed.

It is still another feature of the present invention that the drive mechanism includes means for controlling the indexed movements of the output drive at any varying or fixed speeds.

The aforementioned and other objects and features of the present invention will be fully understood from the following detailed description of the preferred embodiment and the accompanying drawings.

BRIEF DESCRIPTION OF THE DRAWINGS

FIG. 1 is a planar side view of the drive mechanism of the present invention with parts broken away to show details of the structure along 1—1 in FIG. 2.

FIG. 2 is a front view of the various functional elements of the control means for engaging and disengaging a spur gear and a drive gear.

FIG. 3 shows the front view of the drive mechanism as a pawl begins to act upon the locking element for releasing the spur gear.

FIG. 4 shows the front view of the drive mechanism as the pawl is about to release the stopping pin attached to the spur gear from the notch.

FIG. 5 shows the front view of the drive mechanism immediately after the actuating element pushes the stopping pin and thereby moves the spur gear into engagement with the drive gear.

FIG. 6 shows a magnetically actuable trigger means for increasing the advancing speed of the drive mechanism.

FIG. 7 shows several output drive gears connected to be driven by the spur gear for driving film strips or movie films at various speeds.

FIG. 8 shows a shutter mechanism in an operative combination with the control means of the drive mechanism.

FIG. 9 is a schematic block diagram showing a use of the present drive mechanism in advancing a film strip in various ways.

DESCRIPTION OF THE PREFERRED EMBODIMENTS

AS shown in the drawings, generally the drive mechanism of the present invention includes a high speed drive motor 10 of a conventional type which is energizable by a D.C. or A.C. power source 13. The motor 10 is designed to drive its shaft 15 disposed through a base 16 to rotate a rotary drive gear 17. A rotary spur gear 19 having a portion 20 of periphery from which a number of teeth have been removed is rotatably mounted on a shaft 21 fixedly attached to the base frame 16 about a shank 12 so that its gear teeth can be engaged and disengaged from those of the drive gear. An output gear 22 is fixedly coupled to the spur gear for synchronous rotation therewith. Any suitable output drive means, such as, for example, a plurality of gears, as shown in FIG. 7, may be coupled to the output gear 22 to provide output drives at certain indexing speeds.

As will be explained in detail herein below, the control means 24 for indexing the movement of the output gear 22 is designed to engage the spur gear 19 with the driving gear 17 so that the latter rotates the spur gear 19 about its axis 21 mounted on the base 16 until the peripheral portion 20 of the spur gear from which teeth have been removed returns to a position opposite to the drive gear 17. The spur gear is caused to stop when its teeth disengage those of the drive gear 17, by a spring biased stopping means 27 designed to catch a pin 29 fixedly mounted on the underside of the spur gear at the intermediate position thereof in the manner shown.

More particularly, the control means 24 includes spring biased stopping means having an elongated element 31 pivotally connected to the frame 16 by a pivot pin 33. The elongated element 31 includes a notch 35 for receiving and locking the stop pin 29 in the position as shown in FIG. 2 when the spur gear 19 is at the position wherein it is disengaged from the drive gear 17. The notch 35 is so dimensioned that its lagging side wall 34 extends somewhat higher than the tapered leading side wall 36. The leading side wall guides the pin 29 into the notch 35 as the latter is rotated counterclockwise by the rotating spur gear. The higher lagging wall assures positive engagement of the stop pin 29. The locking means includes a coil spring 37 under tension for applying a counterclockwise torque to an end of the elongated element 31 so that it urges the element 31 to rotate counterclockwise against the pin 29; As a result, the notch 35 of the element 31 is kept in positive engagement with the pin 29. The pin 29 is so positioned on the spur gear 19 that when the spur gear 19 disengages the drive gear 17, it is caught in the notch 35 of the locking element 31.

The control means 24 includes a trigger means 41 movably connected to a pivot point 43. The trigger means 41 includes a trigger element 45 having a finger portion 47 with a rectangular recess 49 disposed to engage the tip end of the stopping element 31. The trigger element 45 includes an elongated aperture 51 disposed at a slant as shown in FIG. 2. The aperture 51 permits the trigger element 45 to move somewhat in the slanted direction about the pivot point 43, as the trigger element is moved between a released position as shown in FIG. 2 and an actuated position as shown in FIG. 5. The coil spring 37 which provides the biasing torque for the locking element 31 also urges and keeps the trigger element against a blocking pin 48 at its rest position shown in FIG. 2. This is made possible by connecting one end of the spring to the locking element 31 at a point 50 so that the spring coil 37 provides a counterclockwise torque to the tip end of the locking element 31 about the notch 45 and connecting other end of the coil spring 35 to the trigger element 45 at the point 51 on the trigger element 45. The coil spring 37 under tension also applies a counterwise torque to the locking element 31 and a clockwise torque to the trigger element 45 about their respective pivot pins 33 and 43.

A pin 53 mounted on the frame 16 as shown, and the stop element 29 respectively act as the counter acting points and limit the clockwise movement of the trigger 45 at the rest position and the counterclockwise movement of the locking element 31 as shown in FIG. 2.

The control means 24 includes an actuating member 55 of elongated shape pivotally connected for limited rotation about the pivot pin 33 as shown in FIGS. 2, 3, 4, and 5. The elongated actuating member 55 is tensioned by a coil spring 56. One end of the coil is connected to the elongated member 55 adjacent the pivot 33 and the other end is connected to the frame 16 of the mechanism for providing a predetermined amount of torque in the counterclockwise direction. The member 55 includes a slanting surface 57 which comes in contact with the stop member 29 and applies a force to move the latter somewhat upwardly to the right in the counterclockwise direction. The tension of the coil member 56 is however, adjusted so that the torque produced thereby is not enough to overcome the blocking action provided by the lagging side wall 34 of the notch 35 of the locking element 31, while the locking element 31 retains the pin within the notch 35 in the manner shown in FIG. 2.

The drive mechanism may include a solenoid 61 for actuating the trigger 45. With the solenoid 61 energized, the plunger 63 of the solenoid 61 is pulled downwardly and this pulls the linkage 65. The linkage 65 in turn pulls the trigger element 45 downwardly, as shown in FIG. 3. The trigger element also moves to the right by a small amount as it slides relative to the pivot pin 43.

The present drive mechanism operates as follows. The drive gear 17 is continuously rotated about its axis by the shaft 15 of the motor 10 as long as the motor is energized. The spur gear 19 remains in the stationary position shown in FIG. 2 as long as an actuating signal is not applied to solenoid 61 and the trigger keeps the stop element 29 locked in its notch 35 in the position shown and keeps the spur gear 21 at the position shown. When the solenoid 61 is actuated, the plunger 63 is drawn downwardly and this moves the trigger element 45 downwardly about its pivot pin 43. As the trigger element 45 slides downwardly, the slanting aperture 51 also guides the element 45 move somewhat to the right as shown in FIGS. 3, 4, and 5. As the trigger moves downwardly, the recessed part 49 of its finger 47 comes in contact with the tip end of the locking element 31 and forces the locking element 31 to move downwardly and rotate clockwise about its pivot pin 33. This makes the locking element 31 move away from the pin member 29 and thereby releases the pin member 29 from its notch 35. As this happens, the rightwardly slanting surface 57 of the actuating element 55 forces the pin 29 to move toward the right and in a counterclockwise direction due to the counterclockwise force applied thereto by the coil spring 56. This causes the first few teeth of the spur gear to engage with the gear teeth of the driving gear 17, as shown in FIGS. 4 and 5.

Once the teeth of the spur gear 19 become engaged with those of the drive gear, the spur gear is driven counterclockwise one complete revolution until the peripheral portion 20 of the spur gear where the teeth are removed are placed in the position opposite to the drive gear as shown in FIG. 2. While the spur gear is being driven, the locking element 31 is returned to the locking position shown in FIG. 2 under the influence of the counterclock-wise torque applied thereto by the spring 35 before the spur gear returns to its rest position shown in FIG. 2 and ready to receive the stop member 29 in the notch 35. As the spur gear approaches the rest position, the stop member 29 is guided into the notch 35 by the leading side wall portion 36. As the stop member reaches the notch, the spur gear is disengaged from the drive gear. As shown in the drawings, the lagging side wall 34 protrudes somewhat and the protrusion helps to block the stop member 29 and thereby brings the spur gear to a complete and positive stop and lock it in position. The process of guiding the stop member into the notch 35 and locking it in there is further aided by the pushing element 55 under the tension of the spring member 36.

As evident from above, the indexing mechanism of the present invention provides a positive stop for the spur gear which is independent of the length of the time during which the trigger element 45 is actuated. This is accomplished by designing the trigger 45 and the stopping element 55 so that the stopping element is always returned to the position shown in FIG. 2 immediately after it releases the pin 29, regardless of the time duration during which the trigger element is kept in the actuated position. This is made possible by dimensioning the tip end of the locking element 31 and the rectangular recess 49 of the trigger element 45 dimensioned relative to each other to permit the following action. As soon as the recessed hook portion 49 forces the tip end of the locking element 31 downwardly, the stop member 29 is released from the notch 35 and the actuating member 55 moves the stop member 29 out of the rest position. But the triggering action provided by the recessed portion 49 is only momentary while the trigger is on its way to the fully actuated position as shown in FIG. 5. In the meantime the torque provided by the coil member 37 springs the lock element 31 immediately back to the rest position shown in FIG. 2 and have it ready to catch the pin 29, regardless of whether or not the trigger still remains actuated or released. The slanting channel 51 enables the trigger element 45 to engage the stopping element only momentarily as described by causing the trigger 45 to the right to veer away from the tip end of the stopping element 31, as soon as the stop member 29 clears the retaining side wall 34 of the notch 35.

In accordance with the present invention, as evident from the foregoing description, the control mechanism which indexes the movement of the output drive requires few parts and only a small physical movement. Thus, the trigger element 45 requires a very short travel distance as shown in FIGS. 2, 3 and 4. This makes it possible to keep the time required to actuate the trigger 45 to a minimum, and, accordingly, advance the output load at an extremely fast rate.

Advantageously, the time required to actuate the trigger element can be reduced even further by using a magnetic means such as that shown in FIG. 6. As shown therein, the trigger element 45 is provided with an extended arm portion 71 substantially opposite the rectangular recess 49 of the finger 47. A magnetic element 73, such as a piece of soft iron is embedded in the extended arm 71. A magnetizable permeable element 75 is disposed in spaced relationship to the soft iron piece 73 to provide a suitable gap 77. The element 75 is magnetized by applying an electrical pulse to an induction coil 79. When magnetized, the element 75 attracts the magnetic element 73 and moves the trigger element 45 counterclockwise about the pivot 43, and trigger the locking element 31 clockwise momentarily to release the stop member 29 and enable the drive gear to rotate the driven spur gear in the manner described before. The use of the magnetic element for actuating the indexing means not only eliminates a separate moving element such as the linkage 65 shown in FIG. 1–5, but also enables the control mechanism to operate faster since the air gap 77 can be kept to a minimum by positioning the magnetic element 73 further away from the pivot 43 by extending the arm 71.

FIG. 7 shows an embodiment of the present apparatus wherein the output gear 22 may be coupled to a plurality of output drive gears 81, 82, and 83. The gear ratios between the output gear 22 and the output drive gears 81, 82 and 83 may be adjusted as desired in order to provide necessary output drives for indexing the movement of the output loads such as 8, 16, and 32 mm movie films or film strips of still pictures.

FIG. 8 shows the drive mechanism including a shutter mechanism 84 and means for moving it to the open position A and closed position B. The shutter mechanism includes an elongated arm 85, one end thereof being connected to an opaque element 86, and the other end pivotally connected to a pivot pin 91 to allow the rotational movement of the opaque element about the pin 91. The arm 85 includes an extended portion having an inclined surface 93 opposite the opaque element 86. The actuating element 55 includes an elbow-like protrusion 95 which rests on the inclined surface 93. With the spur gear 21 stopped at the rest position, the actuating element 55 stays at the position shown in solid lines. To assure that the opaque element 86 remains at the position A, a coil spring 96 is provided to pull the arm 85 clockwise until it is stopped by the elbow 95 at the inclined surface 93. Once the spur gear 19 is released from the stopped position and begins to rotate counterclockwise as described above, the spring 56 applies a counterclockwise torque to the actuating element 55 and moves it to the position 55 shown in phantom. In turn, the elbow 95 of the actuating element 55 applies a force at the inclined surface 93 and rotates the shutter arm 85 counterclockwise and thus moves the opaque element 86 to the position B. In this manner, the shutter cooperates with the control mechanism of the present drive mechanism to close the aperture 89 which may be located at the position B while the spur gear 19 is being rotated to index movement of the output gear 22, as the shutter mechanism of the conventional movie projector does.

As generally known, the conventional movie projector is not designed nor is it capable of projecting film strips. Usually, the movie projector is designed to advance the film at a fixed rate, e.g., 24 frames per second, but does not have means that can advance the film at random speeds in the same manner that a film strip projector is required to do. In general, a strip film projector is designed to project a strip of film having a number of still pictures connected in series and does not include a shutter mechanism to interrupt the light during the time interval required for changing the frames of pictures. Consequently, the light beam which projects the pictures the film continues to apply the light even while the strip is being advanced to change frames. This action causes annoyance to the viewer of the film strip, particularly when the frames are changed fast enough to approach the rate at which the movie film is advanced, e.g., 24 frames of picutures per second, because the images of successive frames appear to merge into one image and confuse the viewer. Because of this generally known film strip projectors cannot be used to project a movie film.

The present drive mechanism is highly versatile in that it can eliminate many of the limitations in the operative functions of the drive mechanisms found in the known movie or strip film projectors mentioned above. Thus, it can index the movement of the output drive at a wide range of variable, fixed or changing speeds. It includes the built-in shutter mechanism wherein the action is synchronized with the movement of the control mechanism at whatever speed it advances the output drive.

FIG. 9 schematically illustrates the versatility of the present drive mechanism. Thus, for example, the drive mechanism can be used to advance a film strip 109 manually by closing and opening a manual switch 101 and supplying a D.C. voltage to the solenoid 61. In the alternative, a pulse generator 103 may be connected to supply a train of actuating pulses of varying or constant repetition rates. Alternatively, the solenoid 61 may be actuated by cue signals sensed by a detector 105 from a magnetic tape 107 accompanying the film strip 109. The cue signals are usually spaced in the tape 107 at varying time intervals at the end of voice narrations cued in with the successive frames of pictures of the film strip to which they relate. The drive mechanism can also be used to drive movie film at any fixed rate of speed. In short, the present drive mechanism can be used to index the movement of an output drive at any fixed or varying rate of speed, or slow down or speed up the movement or stop the movement at any particular point for any duration of time.

The present drive mechanism can be modified or changed to meet many specific needs without departing from the spirit and scope of the teachings of the principles of the invention described above. Thus, for example, the mechanism can be readily used to control an output drive which feeds measured quantity of items, such as, liquids and solids into successive containers. This can be readily accomplished by the use of an electronic scale and arranging the scale to generate output signals in succession for successively moving containers to receive the measured amounts of the items.

What is claimed is:

1. A drive mechanism comprising:
a rotary driving member mounted on a base;
a rotary driven member;
means for engaging and disengaging said driven member from said driving member during each revolution of said driven member;
means for stopping and locking said driven member at a rest position upon its disengagement from said driving member means for releasing said driven member from said stopping and locking means; and means for pushing said driven member from said rest position into engagement with said driving member, whereby said driven member is rotated through a predetermined angle and brought to a full stop each time said reseasing means is actuated; said stopping and locking means including a stop member coupled to said driven member for rotation therewith, a first elongated element having one end thereof pivotally connected to said base for rotation thereabout, said elongated element having a notch for receiving said stop member, and first spring means connected to urge said elongated element to move against said stop member, whereby said stop member is received in said notch as said driven member is disengaged from said driving member and locked therein.

2. The drive mechanism according to claim 1, wherein said releasing means includes a trigger normally disposed at a released position and actuable for movement to an actuated position and having a finger for tripping said stopping and locking means and thereby releasing said driven member.

3. The drive mechanism according to claim 2, wherein said pushing means includes a second elongated element, one end thereof being pivotally connected to said base and second spring means connecting said second elongated element to said base and imparting torque to said second elongated element so that said second elongated element pushes said stop member forward as said releasing means releases said stop member from the notch of said first elongated element, thereby engaging said driven member with said driving member.

4. The drive mechanism according to claim 3 wherein said first spring means includes a stretched coil spring with one end thereof being connected to said first elongated element and the other end to said trigger, means including said coil spring for maintaining said trigger at the released position and said first elongated element at the position for stopping and locking said driven member.

5. The drive mechanism according to claim 2, wherein said trigger includes an elongated aperture; a pin member attached to said frame for slidably mounting said trigger to said base between said released and actuated positions;
means including said first spring means for maintaining said trigger at the released position;
means for actuating and moving said trigger to the actuated position; and
said trigger including a finger portion for tripping said stopping and locking means to release momentarily said stop member while said trigger moves from said released position to said actuated position, whereby said stopping and locking means is permitted to return immediately to the position to receive, stop and lock said stop member as said driven member is disengaged from said driving member after its predetermined angular rotation.

6. The drive mechanism according to claim 5, wherein said trigger actuating means includes a solenoid having a plunger actuable in response to an electrical pulse and means connecting said plunger to said trigger.

7. The drive mechanism according to claim 5, wherein said trigger includes a magnetic element and said trigger actuating and moving means includes means responsive to an electrical pulse for applying a magnetic force to pull said magnetic element and actuate said trigger.

8. The drive mechanism according to claim 1, including; a shaft fixedly mounted on said base; said driven member being mounted on said shaft for rotation, said driving member having a rotary gear, said driven member including a spur gear having a peripheral portion from which a number of gear teeth are removed;
a rotary gear mounted on said shaft and being driven by said spur gear; and
a plurality of output gears enmeshed with said rotary gear, wherein the gear ratio between said rotary gear and respective ones of said output gears are of predetermined values for providing predetermined output drives of different speeds.

9. The drive mechanism according to claim 1, including, shutter means pivotally mounted on said base for movement between released and actuated positions, means for maintaining said shutter means at said rest position while said driven member is disengaged from said drive member and moving said shutter means to said actuated position when said driven member is in engagement with said driving member.

10. The drive mechanism according to claim 9, wherein said shutter means includes
a flat opaque element;
an elongated arm connected to said opaque element, and having an extension at the end opposite said opaque element for slidable engagement with said pushing means,
means for pivotally coupling the intermediate part of said elongated arm to said frame; and a coil spring means for maintaining said shutter means in contact with pushing means.

11. A drive mechanism comprising;
a base;
a rotary driving member rotatably mounted on said base;
a rotary driven member rotatably mounted on said base with the periphery thereof being adapted to engage and disengage said driving member during each revolution of said driven member;
a stop element fixedly attached to said driven member;
a first elongated member pivotally mounted on said base and having a recessed notch for receiving said stop element therein;
a trigger movably mounted on said frame between rest and an actuated positions;
means including a first spring connecting said first elongated element to said trigger and positioning said trigger at said rest position and enabling said first elongated element to receive and retain said stop element in said notch as said driven member becomes disengaged from said driving member;
a second elongated element pivotally connected to said base;
second spring means connecting said second elongated element to said base for pushing said second element against said stop element to engage said driven member with said driving member;
wherein the movement of said trigger into said actuated position triggers said first elongated element to rotate about its pivot away from said stop element and enable said second elongated element to push said stop element forward and thereby move said driven member into engagement with said driving member, and said driven member is rotated through a predetermined degree of angular rotation and is brought to a stop by said first elongated member.

12. The drive mechanism according to claim 11, wherein said trigger includes a portion for contacting with said first elongated element momentarily to release said stop element from said notch, said second element is tensioned by said second spring means to push said stop element out of said stopped position; said first element is tensioned by said first spring means to return to the original position immediately after the momentary movement to releasing said stop element to receive and retain said stop element as said driven member becomes disengaged from said drive member after a predetermined angular rotation.

13. The drive mechanism according to claim 12 including a shutter pivotally mounted on said base means for keeping said shutter at first position while said driven member is at rest, and means including said second elongated element for moving said shutter to a second position while said driven member is being rotated by said driving member.

* * * * *